United States Patent
Huang et al.

(10) Patent No.: US 11,457,094 B2
(45) Date of Patent: Sep. 27, 2022

(54) NETWORK SYSTEM AND CONVERSION APPARATUS CROSSING DIFFERENT TRANSMISSION PROTOCOLS

(71) Applicant: QNAP SYSTEMS, INC., New Taipei (TW)

(72) Inventors: Sin-Yao Huang, New Taipei (TW); Po-Han Peng, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/134,905

(22) Filed: Dec. 28, 2020

(65) Prior Publication Data
US 2021/0203758 A1 Jul. 1, 2021

(30) Foreign Application Priority Data
Dec. 26, 2019 (TW) ................. 108147957

(51) Int. Cl.
| | | |
|---|---|---|
| *H04L 29/06* | (2006.01) | |
| *H04L 12/707* | (2013.01) | |
| *H04L 69/08* | (2022.01) | |
| *H04L 45/24* | (2022.01) | |
| *H04L 69/14* | (2022.01) | |
| *H04L 69/163* | (2022.01) | |

(52) U.S. Cl.
CPC ............ *H04L 69/08* (2013.01); *H04L 45/24* (2013.01); *H04L 69/14* (2013.01); *H04L 69/163* (2013.01)

(58) Field of Classification Search
CPC ......... H04L 69/08; H04L 45/24; H04L 69/14; H04L 69/163

USPC ........................................ 709/230
See application file for complete search history.

(56) References Cited

U.S. PATENT DOCUMENTS

| | | | |
|---|---|---|---|
| 9,755,953 B1 * | 9/2017 | Morrissey | H04L 9/12 |
| 10,212,089 B1 * | 2/2019 | Narayanan | H04L 47/125 |
| 10,542,053 B2 | 1/2020 | Wei et al. | |

(Continued)

FOREIGN PATENT DOCUMENTS

EP 2882148 6/2015

OTHER PUBLICATIONS

Internet Engineering Task Force, RFC 6824: TCP Extensions for Multipath Operation with Multiple Addresses, 2013 (Year: 2013).*

(Continued)

*Primary Examiner* — Schquita D Goodwin
(74) *Attorney, Agent, or Firm* — WPAT, PC

(57) ABSTRACT

A network system crossing different transmission protocols includes a user device, a first conversion apparatus, a server device and a second conversion apparatus. Data transmission between the first conversion apparatus and the second conversion apparatus is performed in accordance with network addresses of the first conversion apparatus and the second conversion apparatus, and one of transmission control protocol (TCP) and multipath transmission control protocol (MPTCP) is selected for performing the data transmission. A user packet is transmitted between the first conversion apparatus and the user device in accordance with network addresses of the user device and the server device. A server packet is transmitted between the second conversion apparatus and the server device in accordance with the network addresses of the user device and server devices.

10 Claims, 4 Drawing Sheets

(56) References Cited

U.S. PATENT DOCUMENTS

| | | | | |
|---|---|---|---|---|
| 11,088,944 | B2* | 8/2021 | Allen | H04L 45/24 |
| 2010/0191839 | A1* | 7/2010 | Gandhewar | H04L 61/2015 |
| | | | | 709/220 |
| 2012/0093150 | A1* | 4/2012 | Kini | H04L 45/24 |
| | | | | 370/389 |
| 2016/0094467 | A1* | 3/2016 | Hong | H04L 63/0281 |
| | | | | 370/235 |
| 2017/0244637 | A1* | 8/2017 | Singhal | H04L 45/7453 |
| 2017/0324826 | A1* | 11/2017 | Johnsen | H04L 45/24 |
| 2019/0182363 | A1* | 6/2019 | Bonaventure | H04L 69/14 |
| 2019/0335520 | A1* | 10/2019 | Dion | H04L 12/4633 |
| 2020/0007465 | A1* | 1/2020 | Wu | H04L 45/42 |
| 2020/0092400 | A1* | 3/2020 | Bonaventure | H04L 47/193 |
| 2020/0228633 | A1* | 7/2020 | Yu | H04L 69/14 |
| 2020/0304606 | A1* | 9/2020 | Tourrilhes | H04L 69/14 |
| 2021/0234794 | A1* | 7/2021 | Amend | H04L 69/14 |
| 2021/0314254 | A1* | 10/2021 | Detal | H04L 69/18 |

OTHER PUBLICATIONS

Search report from the TIPO's OA on dated Dec. 29, 2020.
https://tools.ietf.org/id/draft-ayar-transparent-sca-proxy-00.html . A Transparent Performance Enhancing Proxy Architecture To Enable TCP over Multiple Paths for Single-Homed Hosts. Aug. 2, 2012.

* cited by examiner

NETWORK SYSTEM AND CONVERSION APPARATUS CROSSING DIFFERENT TRANSMISSION PROTOCOLS

FIELD OF THE INVENTION

The present disclosure relates to a network system using different transmission protocols, and particularly to a network system crossing different transmission protocols and supporting multipath transmission control protocol (MPTCP).

BACKGROUND OF THE INVENTION

Multipath transmission control protocol (MPTCP) is a newly developed transmission protocol which allows a network connection to use multiple paths for data transmission. Since the technology takes advantage of multiple paths to transmit data simultaneously, MPTCP can provide greater network bandwidth, and it gains an advantage in high-speed transmission, which is attractive particularly in modern network environments.

However, most existing devices do not support the newly-developed MPTCP in data transmission. Thus, popularizing the use of MPTCP to speed up network transmission rate is hindered by the hardware limitation.

SUMMARY OF THE INVENTION

The present disclosure provides a network system and a conversion apparatus crossing different transmission protocols. Through the use of the conversion apparatus of the present disclosure, a device non-compliant with MPTCP can work well in an MPTCP network system.

An aspect of the present disclosure provides a network system crossing transmission protocols. The network system includes a first conversion apparatus, a second conversion apparatus, a user device and a server device. A user packet is transmitted between the user device and the first conversion apparatus in accordance with transmission control protocol (TCP), and a server packet is transmitted between the server device and the second conversion apparatus in accordance with TCP. Data transmission between the first conversion apparatus and the second network conversion apparatus is performed in accordance with network addresses of the first conversion apparatus and the second network conversion apparatus, and one of TCP and multipath transmission control protocol (MPTCP) is selected for performing the data transmission. The user packet is transmitted between the first conversion apparatus and the user device in accordance with network addresses of the user device and the server device, and the server packet is transmitted between the second conversion apparatus and the server device in accordance with the network addresses of the user device and the server device.

In an embodiment, the first conversion apparatus includes a user-path database for storing connection information, and first MPTCP packets are transmitted between the first conversion apparatus and the second conversion apparatus in accordance with the connection information stored in the user-path database. The second conversion apparatus includes a server-path database for storing the connection information, and second MPTCP packets are transmitted between the second conversion apparatus and the first conversion apparatus in accordance with the connection information stored in the server-path database.

In an embodiment, after the first conversion apparatus receives the user packet from the user device, the first conversion apparatus transmits a coordination path packet to the second conversion apparatus in accordance with TCP. Specifically, a source address of the coordination path packet is set to the network address of the first conversion apparatus, and the network address of the user device is included in a content of the coordination path packet.

In an embodiment, the second conversion apparatus designates routing paths connected between the second conversion apparatus and the first conversion apparatus and using MPTCP for the data transmission according to the coordination path packet, stores the connection information corresponding to the routing paths in the server-path database, and transmits the connection information corresponding to the routing paths to the first conversion apparatus. After that, the first conversion apparatus stores the connection information corresponding to the routing paths in the user-path database.

In an embodiment, after the second conversion apparatus receives the first MPTCP packets from the first conversion apparatus through the routing paths corresponding to the connection information, the second conversion apparatus generates and transmits the server packet to the server device. Specifically, the network address of the user device is used as a source address of the server packet, the network address of the server device is used as a destination address of the server packet, and data encapsulated in the first MPTCP packets are combined to form data encapsulated in the server packet.

In an embodiment, after the second conversion apparatus receives the server packet from the server device, the second conversion apparatus generates and transmits the second MPTCP packets to the first conversion apparatus in accordance with the MPTCP. Specifically, the network address of the second conversion apparatus is used as a source address of the second MPTCP packets, and data encapsulated in the server packet are divided into data encapsulated in the second MPTCP packets.

In an embodiment, after the first conversion apparatus receives the second MPTCP packets transmitted from the second conversion apparatus in accordance with the connection information stored in the user-path database, the first conversion apparatus generates and transmits the user packet to the user device. Specially, the network address of the server device is used as a source address of the user packet, the network address of the user device is used as a destination address of the user packet, and the data encapsulated in the second MPTCP packets are combined to form data encapsulated in the user packet.

In an embodiment, when the user packet transmitted from the user device requests to terminate network connection, the server device terminates the network connection according to the server packet corresponding to the user packet. The first conversion apparatus deletes the connection information related to the network connection from the user-path database, and the second conversion apparatus deletes the connection information related to the network connection from the server-path database.

Another aspect of the present disclosure provides a conversion apparatus crossing transmission protocols. The conversion apparatus receives data from a mediation device and transmits the received data to a user device. The conversion apparatus includes a first network interface module, a second network interface module, a memory and a processing module. The first network interface module is adapted to be connected to the user device in accordance with transmission control protocol (TCP), and the second network interface module is adapted to be connected to a plurality of routing paths. The memory stores a network address of the mediation device and a network address of a server device corresponding to the mediation device. The processing module is electrically coupled to the first network interface module, the second network interface module and the memory to control the second network interface module to perform data transmission with the mediation device through the routing paths in accordance with one of TCP or multipath transmission control protocol (MPTCP), Specially, a source address of the data transmitted from the mediation device to the conversion apparatus is set to the network address of the mediation device. The processing module of the conversion apparatus encapsulates the received data into a network packet with a source address set to the network address of the server device before forwarding the received data to the user device.

According to the present disclosure, a user device or a server device which supports TCP only but does not comply with MPTCP can work well in an MPTCP network system by employing the conversion apparatus. Therefore, the advantage of MPTCT, e.g. increased transmission bandwidth, can be achieved without replacing the existing non-compliant devices with new ones supporting MPTCP.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
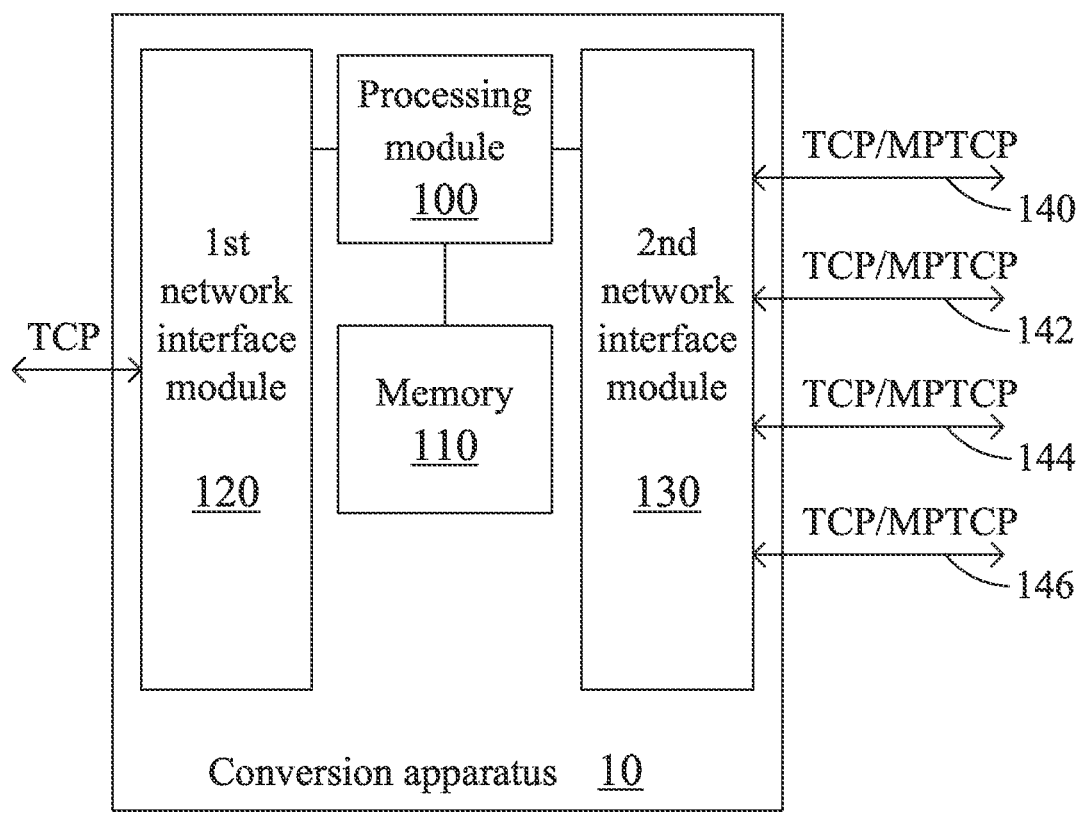
FIG. 1 is a block diagram illustrating a conversion apparatus crossing different transmission protocols according to an embodiment of the present disclosure.

Please refer to FIG. 1, which is a block diagram illustrating a conversion apparatus crossing different transmission protocols according to an embodiment of the present disclosure. In the embodiment, the conversion apparatus 10 includes a processing module 100, a memory 110, a first network interface module 120 and a second network interface module 130. The processing module 100 is electrically coupled to the memory 110, the first network interface module 120 and the second network interface module 130 to allow the processing module 100 to transfer data from/to the memory 110, the first network interface module 120 and the second network interface module 130, respectively. The first network interface module 120 is further electrically coupled to a user device (not shown), and data transmission between the first network interface module 120 and the user device is performed based on transmission control protocol (TCP). The second network interface module 130 is electrically coupled to multiple routing paths 140, 142, 144 and 146. The processing module 100 controls the second network interface module 130 to select one of TCP and multipath transmission control protocol (MPTCP) for transmitting data between the second network interface module 130 and a mediation device (not shown) through the routing paths 140, 142, 144 and/or 146. The memory 110 is configured to store the network address (Internet Protocol address) of the mediation device and the network address of a server device (not shown) corresponding to the mediation device.

When the conversion apparatus 10 receives data from the mediation device and would transit the received data to the user device, the processing module 100 acquires the network address of the mediation device in the received data (e.g. according to the source address field in the received data). Then, the processing module 100 acquires the network address of the server device corresponding to the mediation device according to the network address of the mediation device. After that, the source address field in the data to be forwarded to the user device is filled with the network address of the server device so that the user device knows the data source.

On the other hand, when the conversion apparatus 10 receives data from the user device and would transmit the received data through the second network interface module 130, the conversion apparatus 10 communicate with the destination device through the second network interface module 130 to get the usable transmission protocol(s). After that, the conversion apparatus 10 selects one of the usable transmission protocol(s) (e.g. TCP or MPTCP) for performing the data transmission.

In an embodiment, the mediation device is a server device capable of transferring data in accordance with MPTCP. In this condition, the network address of the mediation device could be the same as the network address of the server device or not. In another embodiment, the mediation device could be a packet switch (e.g. another conversion apparatus 10 of the present disclosure) for forwarding packets to a source device wherein the packet switch supports MPTCP. The server device is connected to the packet switch in accordance with TCP or MPTCP. Therefore, the network address of the mediation device is different from the network address of the server device in this condition.

According to the present disclosure, the conversion apparatus 10 can receive data in accordance with MPTCP and turn to transfer the data in accordance with TCP, and on the other hand, the conversion apparatus 10 can receive data in accordance with TCP and turn to transfer the data in accordance with MPTCP. Therefore, a device which can not transfer data in accordance with MPTCP can work in an MPTCP network system by introducing the conversion apparatus 10 without purchasing a certain amount of hardware adopting MPTCP to replace the currently available devices.

To demonstrate the advantages of the present disclosure, the following example gives how a device supporting TCP only can operate in an MPTCP network system.

Figure 2:
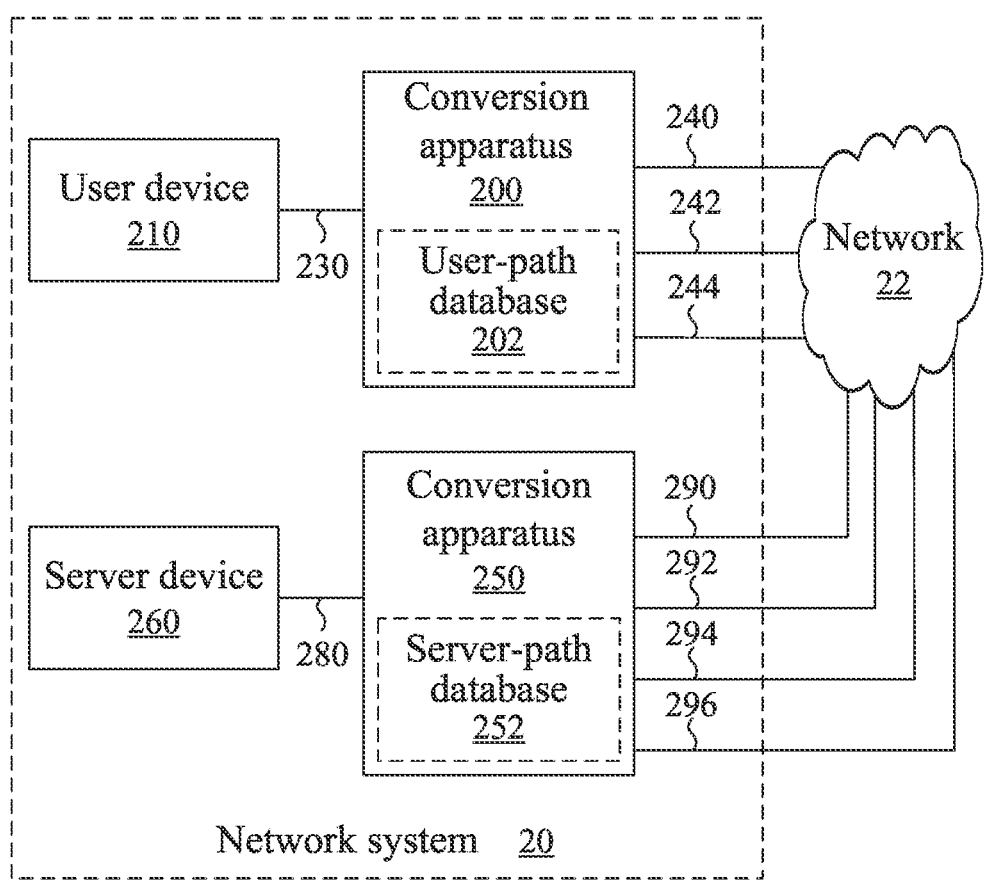
FIG. 2 is a block diagram illustrating the architecture of a network system crossing different transmission protocols according to an embodiment of the present disclosure.

Please refer to FIG. 2, which is a block diagram illustrating the architecture of a network system crossing different transmission protocols according to an embodiment of the present disclosure. In this diagram, the network system 20 includes two conversion apparatuses 200 and 250, a user device 210 and a server device 260. It is to be noted that the conversion apparatus 200 could be electrically coupled to more than one user devices, and the conversion apparatus 250 could be electrically coupled to more than one server device in practice. A simplified example involving one user device 210 and one server device 260 is given here. The data transmission processes between multiple user devices and multiple server devices can be derived from the concepts presented in the following description.

In the embodiment, each of the conversion apparatus 200 and the conversion apparatus 250 is implemented by the conversion apparatus 10 in FIG. 1 or an apparatus including the conversion apparatus 10 in FIG. 1. The user device 210 and the server device 260 are network devices which support TCP, but not support MPTCP. As shown in FIG. 2, the user device 210 is electrically coupled to the conversion apparatus 200 (the user device 210 is electrically coupled to the first network interface module 120 in FIG. 1, for example) in accordance with TCP through a routing path 230. Therefore, the data transmission between the conversion apparatus 200 and the user device 210 is performed based on TCP. Similarly, the server device 260 is electrically coupled to the conversion apparatus 250 (the server device 260 is electrically coupled to the first network interface module 120 in FIG. 1, for example) in accordance with TCP through a routing path 280. Therefore, the data transmission between the conversion apparatus 250 and the server device 260 is performed based on TCP.

Similar to the conversion apparatus 10 described with reference to FIG. 1, the conversion apparatus 200 and the conversion apparatus 250 in the embodiment can transfer data from/to the user device 210 or the server device 260 supporting TCP only through a network interface (e.g. the first network interface module 120 in FIG. 1). On the other hand, the conversion apparatus 200 and the conversion apparatus 250 can transfer data from/to devices supporting MPTCP through another network interface (e.g. the second network interface module 130 in FIG. 1) connected to a network 22. In the embodiment, the conversion apparatus 200 is electrically coupled to the network 22 through routing paths 240, 242 and 244, and the conversion apparatus 250 is electrically coupled to the network 22 through routing paths 290, 292, 294 and 296. The routing paths 240, 242, 244, 290, 292, 294 and 296 are separate and independent physical circuits for data transmission, and any one of the routing paths could be implemented by a leased line provided by a company A, a 4G network provided by a company B, a wireless network built by a company C or the like. The number of the routing paths to be connected to the conversion apparatus 200 or 250 is not limited, and is determined according to the supportability of MPTCP in practice.

Figure 3:
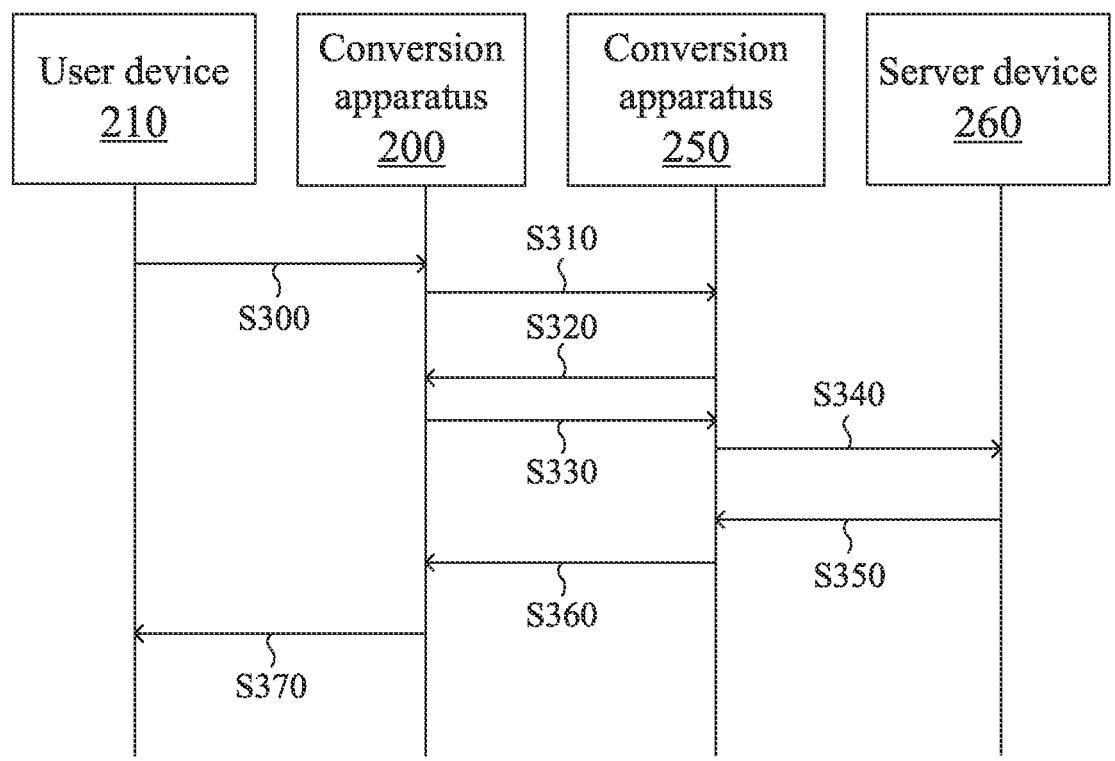
FIG. 3 is a sequence diagram showing a data transmission process in the network system according to an embodiment of the present disclosure.

The operation of the network system 20 of FIG. 2 is described with referring to FIG. 1, FIG. 2 and FIG. 3. FIG. 3 is a sequence diagram showing a data transmission process in the network system crossing different transmission protocols according to an embodiment of the present disclosure. The vertical lines (lifelines) represent the sequence of the steps performed in the data transmission process. For illustration purposes only, network packets transferred between the conversion apparatus 200 and the user device 210 are called user packets hereinafter no matter whether the network packets are transmitted from the conversion apparatus 200 to the user device 210 or transmitted from the user device 210 to the conversion apparatus 200. Similarly, network packets transferred between the conversion apparatus 250 and the server device 260 are called server packets hereinafter no matter whether the network packets are transmitted from the conversion apparatus 250 to the server device 260 or transmitted from the server device 260 to the conversion apparatus 250.

In FIG. 3, at first, the user device 210 issues a user packet in accordance with TCP to request data from the server device 260 (step S300). According to the TCP specification, the user packet is transmitted in accordance with the network address of the user device 210 and the network address of the server device 260. Specially, in the user packet, the network address of the user device 210 is viewed as the source address, the network port of the user device 210 is viewed as the source port, the network address of the server device 260 is viewed as the destination address, and the network port of the server device 260 is viewed as the destination port.

The conversion apparatus 200 receives the user packet (e.g. through the first network interface module 120 in FIG. 1) issued from the user device 210. Once receiving the user packet, the conversion apparatus 200 sends a connection request (e.g. through the second network interface module 130 in FIG. 1) in accordance with TCP (step S310). After receiving the connection request, the conversion apparatus 250 communicates with the conversion apparatus 200 first to decide an agreed transmission protocol (step S320). Since the conversion apparatus 200 and the conversion apparatus 250 support data transmission based on MPTCP, the subsequent data transmission between the conversion apparatus 200 and the conversion apparatus 250 will be performed in accordance with MPTCP if the network environment built between the conversion apparatus 200 and the conversion apparatus 250 supports MPTCP transmission.

After the communication for deciding the transmission protocol, the conversion apparatus 200 transmits the data content of the received user packet to the conversion apparatus 250 in accordance with MPTCP (step S330). The MPTCP transmission between the conversion apparatus 200 and the conversion apparatus 250 is performed in accordance with the network addresses and the network ports of the conversion apparatus 200 and the conversion apparatus 250. Specially, when the conversion apparatus 200 transmits data to the conversion apparatus 250 in accordance with MPTCP, the conversion apparatus 200 takes its network address and the network port as the source address and the source port, and takes the network address and the network port of the conversion apparatus 250 as the destination address and the destination port. On the contrary, when the conversion apparatus 250 transmits data to the conversion apparatus 200 in accordance with MPTCP, the conversion apparatus 250 takes its network address and network port as the source address and the source port, and takes the network address and the network port of the conversion apparatus 200 as the destination address and the destination port.

After receiving the data from the conversion apparatus 200, the conversion apparatus 250 starts to forward the received data to the server device 260 (step S340). At this time, since the server device 260 only supports data transmission based on TCP, the network packet (i.e. the server packet) transmitted from the conversion apparatus 250 to the server device 260 should be a network packet compliant with TCP. Specially, in the server packet, the source address is set to the network address of the user device 210, the source port is set to the network port provided by the user device 210 for current connection, the destination address is set to the network address of the server device 260, and the destination port is set to the network port of the server device 260 to be connected. For correctly setting the server packet, the conversion apparatus 250 should obtain the network address of the user device 210 and the network port provided by the user device 210 and used in the current connection in advance.

In response to receiving the server packet from the conversion apparatus 250 in step S340, the server device 260 processes the received server packet and generates another server packet by treating the user device 210 as the destination device in the response server packet (step S350). At this time, in the response server packet, the source address and the source port are set to the network address and the network port of the server device 260, respectively, and the destination address and the destination port are set to the network address and the network port of the user device 210, respectively.

Once receiving the response server packet from the server device 260, the conversion apparatus 250 forwards the data content of the response server packet to the conversion apparatus 200 in accordance with the agreed transmission protocol (e.g. MPTCP in the embodiment) (step S360). After receiving the data from the conversion apparatus 250, the conversion apparatus 200 converts the data into a user packet in accordance with TCP and transmits the TCP user packet to the user device 210 (step S370). At this time, in the user packet transmitted from the conversion apparatus 200 to the user device 210, the source address and the source port are set to the network address and the network port of the server device 260, respectively, and the destination address and the destination port are set to the network address and the network port of the user device 210, respectively. For setting the user packet, the conversion apparatus 200 should know that the received data are transmitted from the server device 260 to the user device 210 in response to the request issued from the user device 210.

Figure 4:
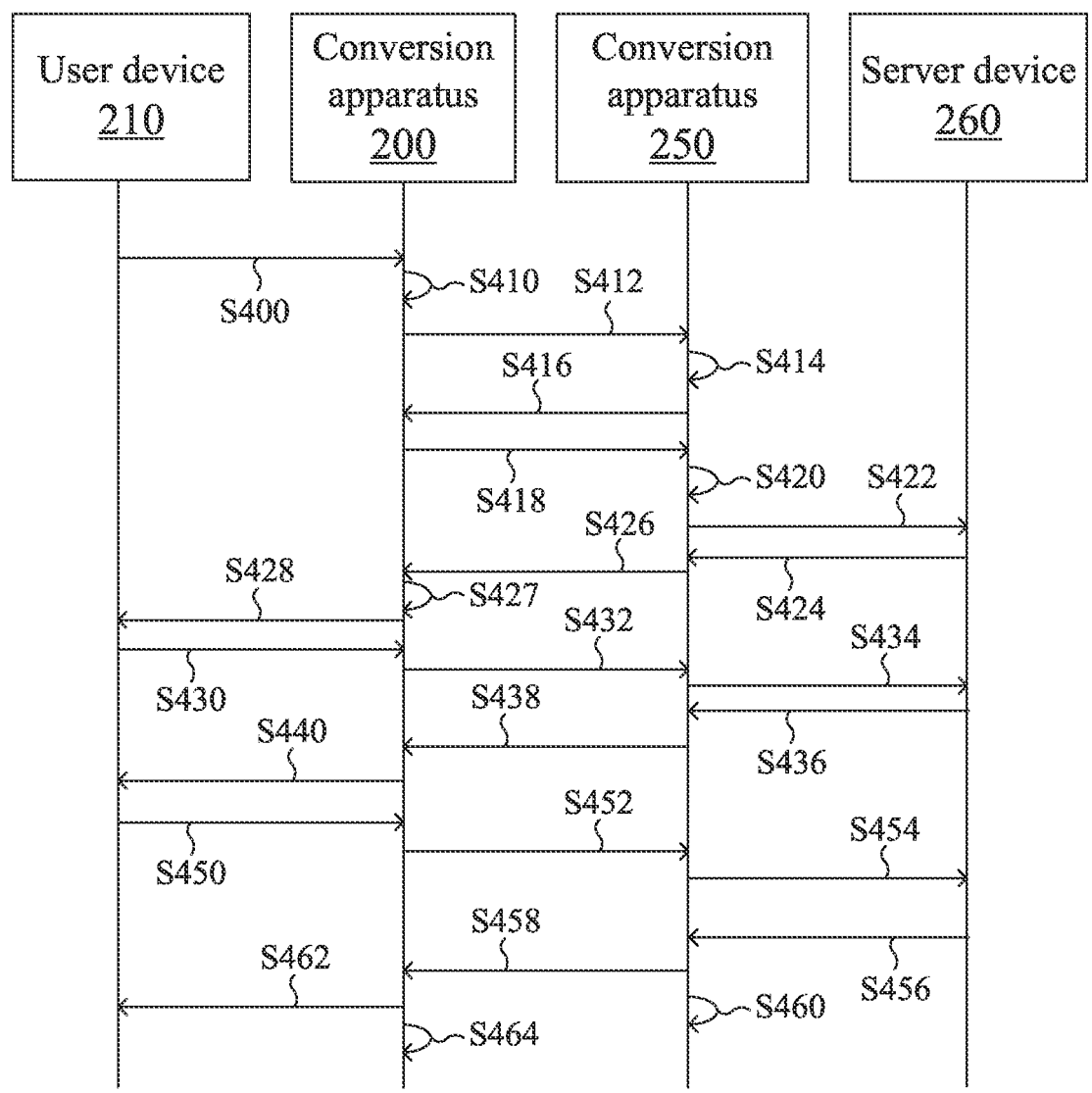
FIG. 4 is a sequence diagram showing a data transmission process in the network system according to another embodiment of the present disclosure.

Please refer to FIG. 1, FIG. 2 and FIG. 4 and a more detailed description of operation of the network system 20 of FIG. 2 is given herein. FIG. 4 is a sequence diagram showing a data transmission process in the network system crossing different transmission protocols according to another embodiment of the present disclosure. The vertical lines (lifelines) represent the sequence of the steps in the data transmission process.

In the embodiment, at first, the user device 210 issues a user packet in accordance with TCP to request data from the server device 260 (step S400). In the user packet, the network address of the user device 210 is used as the source address, the network port of the user device 210 is used as the source port, the network address of the server device 260 is used as the destination address, and the network port of the server device 260 is used as the destination port.

The conversion apparatus 200 receives the user packet issued from the user device 210 through a network interface (e.g. the first network interface module 120 in FIG. 1). Once receiving the user packet, the conversion apparatus 200 is controlled by the processing module 100 to generate a corresponding coordination path packet according to the user packet (step S410). Specially, the source address and the source port are set to the network address and the network port of the conversion apparatus 200, respectively, and the destination address and the destination port are set to the network address and the network port of the server device 260, respectively. The content of the coordination path packet transferred between the conversion apparatus 200 and the conversion apparatus 250 includes the network address of the user device 210, the network port which the user device 210 provides for this connection, and the connection identifier used in MPTCP. Such concept is contrary to the prior arts which put the network address, the network port and the connection identifier in the header of the network packet, but not the content of the network packet as taught by the present disclosure.

After generating the coordination path packet, the conversion apparatus 200 sends the coordination path packet through a network interface (e.g. the second network interface module 130 in FIG. 1) connected to the network 22 in accordance with TCP (step S412). The conversion apparatus 250 receives the coordination path packet and realizes, from the destination address in the coordination path packet, that the destination device is the server device 260 connected to the conversion apparatus 250. Then, the conversion apparatus 250 designates the transmission paths (e.g. routing paths 290 and 292) for data transmission with the conversion apparatus 200. The connection information, including the network address and the network port of the user device 210, the connection identifier and the transmission paths designated for the data transmission with the conversion apparatus 200, are stored in a server-path database 252 for later use (step S414).

The connection information stored in the server-path database 252 is partially or entirely transmitted to the conversion apparatus 200 according to individual requirement. The conversion apparatus 200 records the connection information in the user-path database 202, and prepares for data transmission based on MPTCP in accordance with the connection information (step S416). Subsequently, the conversion apparatus 200 transmits packets based on MPTCP in accordance with the connection information stored in the user-path database 202. Also, the conversion apparatus 250 could transmit packets based on MPTCP in accordance with the connection information stored in the server-path database 252.

The real handshaking process related to MPTCP is much complicated, and just brief description is given above. The entire handshaking process should be performed between the steps S412~S416, and subsequent data transmission based on MPTCP will follow. The data transmitted in accordance with MPTCP is called MPTCP packet hereinafter in a more concise way.

After the handshaking process related to MPTCP, the conversion apparatus 200 starts to transmit data to the conversion apparatus 250 in accordance with MPTCP (step S418). During the data transmission from the conversion apparatus 200 to the conversion apparatus 250, the data content in the user packet could be divided into MPTCP packets transmitted through more than one available routing path. In the MPTCP packets, the source address and the source port are set to the network address and the network port of the conversion apparatus 200, respectively, and the destination address and the destination port are set to the network address and the network port of the conversion apparatus 250, respectively.

Afterwards, the conversion apparatus 250 receives the MPTCP packets from the conversion apparatus 200 through a network interface (e.g. the second network interface module 130 in FIG. 1). The conversion apparatus 250 stores the MPTCP packets temporarily (e.g. in the memory 110 or the like). The processing module 100 or other similar element combines the MPTCP packets in a correct sequence (e.g. according to the sequence number of the MPTCP packets) to recover original data (payload) (step S420). The sequence number of the MPTCP packets is defined in accordance with the MPTCP specification and could be put into practice without further description about the details.

The recovered data are encapsulated in a server packet compliant with TCP. The conversion apparatus 250 sends the server packet through another network interface (similar to the first network interface module 120 in FIG. 1) (step S422). In the server packet, the source address and the source port are set to the network address and the network port of the user device 210, respectively, and the destination address and the destination port are set to the network address and the network port of the server device 260, respectively.

Once receiving the server packet, the server device 260 processes the server packet in accordance with the connection information in the server packet to generate a response server packet (step S424). In the response server packet, the source address and the destination source are set to the network address and the network port of the server device 260, respectively, and the destination address and the destination port are set to the network address and the network port of the user device 210, respectively.

The conversion apparatus 250 receives the server packet from the server device 260 and divides the received server packet into MPTCP packets to be transmitted through available routing paths (step S426). In the MPTCP packets, the source address and the source port are set to the network address and the network port of the conversion apparatus 250, respectively, and the destination address and the destination port are set to the network address and the network port of the conversion apparatus 200, respectively. After that, the conversion apparatus 200 receives the MPTCP packets from the conversion apparatus 250, and stores the MPTCP packets temporarily (e.g. in the memory 110 or the like). The processing module 100 or other similar element combines the MPTCP packets in a correct sequence (e.g. according to the sequence number of the MPTCP packets) to recover the original data (payload) (step S427).

The recovered data are carried in a user packet compliant with TCP. The conversion apparatus 200 sends the user packet to the user device 210 through the network interface (similar to the first network interface module 120 in FIG. 1) (step S428). In the user packet, the source address and the source port are set to the network address and the network port of the server device 260, respectively, and the destination address and the destination port are set to the network address and the network port of the user device 210, respectively.

Now, the connection linking the user device 210, the conversion apparatus 200, the conversion apparatus 250 and the server device 260 is established completely. Subsequently, data can be transmitted through the connection. As shown in FIG. 4, steps S430, S432, S434, S436, S438 and S440 indicate the data transmission between the user device 210 and the server device 260. The steps S430~S440 are similar to the steps S400, S410 and S418~428 as described above and related details are not given again.

When the user device 210 decides to terminate the connection, the user device 210 sends a user packet in accordance with TCP to request termination of the connection (step S450). The user packet could be transmitted to the conversion apparatus 200, the conversion apparatus 250 and the server device 260 in sequence in accordance with corresponding transmission protocols through the connection (steps S452 and S454). After the server device 260 responds to the termination request (step S456), the response is transmitted to the conversion apparatus 250, the conversion apparatus 200 and the user device 210 in sequence in accordance with corresponding transmission protocols through the connection (steps S458 and S462). During the response procedure, the conversion apparatus 250 deletes the related connection information temporarily stored in the server-path database 252 (step S460). Also, the conversion apparatus 200 deletes the related connection information temporarily stored in the user-path database 202 (step S464).

In another embodiment, the network packets relating to the connection termination request and the response to the connection termination request could be transmitted in accordance with TCP during the entire termination-related procedure. Thus, the conversion apparatus 200 and the conversion apparatus 250 can delete the connection information stored in the user-path database 202 and the server-path database 252 at other opportune moment.

As described above, although the user device and the server device only support TCP but not support MPTCP, the user device and the server device can still operate in the MPTCP network system by introducing the conversion apparatus of the present disclosure. Accordingly, it is not necessary to replace the devices adapted for the MPTCP network system. The existing devices can be used in the MPTCP network system with greater bandwidth to gain the advantage in high-speed transmission. Furthermore, the server device can obtain the network address of the device (i.e. the user device) which makes the request for the data, and unauthorized access can be avoided to the utmost.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

The invention claimed is:

1. A network system crossing transmission protocols, comprising:
   a first conversion apparatus;
   a second conversion apparatus;
   a user device wherein a user packet is transmitted between the user device and the first conversion apparatus in accordance with transmission control protocol (TCP); and
   a server device wherein a server packet is transmitted between the server device and the second conversion apparatus in accordance with TCP, wherein
   data transmission between the first conversion apparatus and the second conversion apparatus is performed in accordance with multipath transmission control protocol (MPTCP), wherein the first conversion apparatus takes its network address and network port as a source address and a source port, and takes network address and network port of the second conversion apparatus as a destination address and a destination port, and wherein the second conversion apparatus takes its network address and network port as a source address and a source port, and takes network address and network port of the first conversion apparatus as a destination address and a destination port,
   the user packet is transmitted between the first conversion apparatus and the user device in accordance with network addresses of the user device and the server device, and
   the server packet is transmitted between the second conversion apparatus and the server device in accordance with the network addresses of the user device and the server device;
   wherein the first conversion apparatus comprises a user-path database for storing connection information, and multipath transmission control protocol (MPTCP) packets are transmitted between the first conversion apparatus and the second conversion apparatus in accordance with the connection information stored in the user-path database; and the second conversion apparatus comprises a server-path database for storing the connection information, and the multipath transmission control protocol (MPTCP) packets are transmitted between the second conversion apparatus and the first conversion apparatus in accordance with the connection information stored in the server-path database;

wherein after the first conversion apparatus receives the user packet from the user device, the first conversion apparatus transmits a coordination path packet to the second conversion apparatus in accordance with TCP wherein the coordination path packet includes a header and a content, a source address of the coordination path packet is set to the network address of the first conversion apparatus, and the network address of the user device is included in the content of the coordination path packet;

wherein the second conversion apparatus designates routing paths connected between the second conversion apparatus and the first conversion apparatus and using MPTCP for the data transmission according to the coordination path packet, stores the connection information corresponding to the routing paths in the server-path database, and transmits the connection information corresponding to the routing paths to the first conversion apparatus; and the first conversion apparatus stores the connection information corresponding to the routing paths in the user-path database.

2. The network system according to claim 1, wherein after the second conversion apparatus receives the MPTCP packets from the first conversion apparatus through the routing paths corresponding to the connection information, the second conversion apparatus generates and transmits the server packet to the server device, wherein the network address of the user device is used as a source address of the server packet, the network address of the server device is used as a destination address of the server packet, and data encapsulated in the MPTCP packets are combined to form data encapsulated in the server packet.

3. The network system according to claim 1, wherein after the second conversion apparatus receives the server packet from the server device, the second conversion apparatus generates and transmits the MPTCP packets to the first conversion apparatus in accordance with the MPTCP, wherein the network address of the second conversion apparatus is used as a source address of the MPTCP packets, and data encapsulated in the server packet are divided into data encapsulated in the MPTCP packets.

4. The network system according to claim 3, wherein after the first conversion apparatus receives the MPTCP packets transmitted from the second conversion apparatus in accordance with the connection information stored in the user-path database, the first conversion apparatus generates and transmits the user packet to the user device, wherein the network address of the server device is used as a source address of the user packet, the network address of the user device is used as a destination address of the user packet, and the data encapsulated in the MPTCP packets are combined to form data encapsulated in the user packet.

5. The network system according to claim 1, wherein when the user packet transmitted from the user device requests to terminate network connection, the server device terminates the network connection according to the server packet corresponding to the user packet, the first conversion apparatus deletes the connection information related to the network connection from the user-path database, and the second conversion apparatus deletes the connection information related to the network connection from the server-path database.

6. A network system crossing transmission protocols, comprising:

a first conversion apparatus;

a second conversion apparatus;

a user device wherein a user packet is transmitted between the user device and the first conversion apparatus in accordance with transmission control protocol (TCP); and a server device wherein a server packet is transmitted between the server device and the second conversion apparatus in accordance with TCP, wherein data transmission between the first conversion apparatus and the second conversion apparatus is performed using network addresses of the first conversion apparatus and the second network conversion apparatus in accordance with multipath transmission control protocol (MPTCP), the user packet is transmitted between the first conversion apparatus and the user device in accordance with network addresses of the user device and the server device, and the server packet is transmitted between the second conversion apparatus and the server device in accordance with the network addresses of the user device and the server device, and wherein the first conversion apparatus comprises a user-path database for storing connection information, and multipath transmission control protocol (MPTCP) packets are transmitted between the first conversion apparatus and the second conversion apparatus in accordance with the connection information stored in the user-path database; and the second conversion apparatus comprises a server-path database for storing the connection information, and the multipath transmission control protocol (MPTCP) packets are transmitted between the second conversion apparatus and the first conversion apparatus in accordance with the connection information stored in the server-path database;

wherein after the first conversion apparatus receives the user packet from the user device, the first conversion apparatus transmits a coordination path packet to the second conversion apparatus in accordance with TCP wherein the coordination path packet includes a header and a content, a source address of the coordination path packet is set to the network address of the first conversion apparatus, and the network address of the user device is included in the content of the coordination path packet;

wherein the second conversion apparatus designates routing paths connected between the second conversion apparatus and the first conversion apparatus and using MPTCP for the data transmission according to the coordination path packet, stores the connection information corresponding to the routing paths in the server-path database, and transmits the connection information corresponding to the routing paths to the first conversion apparatus; and the first conversion apparatus stores the connection information corresponding to the routing paths in the user-path database.

7. The network system according to claim 6, wherein after the second conversion apparatus receives the MPTCP packets from the first conversion apparatus through the routing paths corresponding to the connection information, the second conversion apparatus generates and transmits the server packet to the server device, wherein the network address of the user device is used as a source address of the server packet, the network address of the server device is used as a destination address of the server packet, and data encapsulated in the MPTCP packets are combined to form data encapsulated in the server packet.

8. The network system according to claim 6, wherein after the second conversion apparatus receives the server packet from the server device, the second conversion apparatus generates and transmits the MPTCP packets to the first conversion apparatus in accordance with the MPTCP, wherein the network address of the second conversion apparatus is used as a source address of the MPTCP packets, and data encapsulated in the server packet are divided into data encapsulated in the MPTCP packets.

9. The network system according to claim 8, wherein after the first conversion apparatus receives the MPTCP packets transmitted from the second conversion apparatus in accordance with the connection information stored in the user-path database, the first conversion apparatus generates and transmits the user packet to the user device, wherein the network address of the server device is used as a source address of the user packet, the network address of the user device is used as a destination address of the user packet, and the data encapsulated in the MPTCP packets are combined to form data encapsulated in the user packet.

10. The network system according to claim 6, wherein when the user packet transmitted from the user device requests to terminate network connection, the server device terminates the network connection according to the server packet corresponding to the user packet, the first conversion apparatus deletes the connection information related to the network connection from the user-path database, and the second conversion apparatus deletes the connection information related to the network connection from the server-path database.

* * * * *